United States Patent [19]
Katta et al.

[11] Patent Number: 6,083,547
[45] Date of Patent: Jul. 4, 2000

[54] METHOD FOR OBTAINING A HIGH BETA-GLUCAN BARLEY FRACTION

[75] Inventors: Sarath K. Katta; Sambasiva R. Chigurupati; Elizabeth A. Arndt, all of Omaha, Nebr.

[73] Assignee: ConAgra, Inc., Omaha, Nebr.

[21] Appl. No.: 09/231,936

[22] Filed: Jan. 14, 1999

[51] Int. Cl.$^7$ .................................................... A23L 1/10
[52] U.S. Cl. ...................... 426/443; 426/615; 426/618; 426/622; 426/629; 426/648; 426/452; 426/459; 426/463; 426/464; 426/481
[58] Field of Search ................................ 426/549, 615, 426/618, 622, 629, 648, 658, 443, 452, 459, 463, 464, 481, 482, 483, 496, 497

[56] References Cited

U.S. PATENT DOCUMENTS

| | | | |
|---|---|---|---|
| 4,110,163 | 8/1978 | Hjortshoj et al. | 195/62 |
| 4,311,714 | 1/1982 | Goering et al. | 426/28 |
| 4,341,805 | 7/1982 | Chaudhary | 426/481 |
| 4,428,967 | 1/1984 | Goering et al. | 426/28 |
| 4,903,414 | 2/1990 | White et al. | 34/15 |
| 5,013,561 | 5/1991 | Goering et al. | 426/28 |
| 5,024,996 | 6/1991 | Ringe | 426/441 X |
| 5,063,078 | 11/1991 | Foehse | 426/618 |
| 5,106,640 | 4/1992 | Lehtomäki et al. | 426/436 |
| 5,151,283 | 9/1992 | Foehse et al. | 426/93 |
| 5,281,432 | 1/1994 | Zallie et al. | 426/549 |
| 5,458,893 | 10/1995 | Smith | 426/18 |
| 5,480,669 | 1/1996 | Zallie et al. | 426/549 |
| 5,518,710 | 5/1996 | Bhatty | 424/195.1 |
| 5,614,242 | 3/1997 | Fox | 426/549 |
| 5,725,901 | 3/1998 | Fox | 426/618 |
| 5,849,590 | 12/1998 | Malkki et al. | 426/433 |

OTHER PUBLICATIONS

Nonwheat Grains and Products, vol. 72, No. 4, 1995, pp 379–384, Starch Purification After Pin Milling and Air Classification of Waxy, Normal, and High Amylose Barleys, Authored By: T. Vasanthan and R. S. Bhatty.

Engineering and Processing, Cereal Chemistry, pp 220–223, Protein– and β–Glucan Enriched Fractions from High–Protein, High β–Glucan Barleys by Sieving and Air Classification, Authored By: Y. Victor Wu, Arthur C. Stringfellow, and George E. Inglett.

Simopoulos AP (ed): Plants in Human Nutrition, World Rev Nutr Diet. Basel, Karger, 1995, vol. 77, pp 89–108, Barley Foods and Their Influence on Cholesterol Metabolism, Authored By: Graeme H. McIntosh, Rosemary K. Newman, C. Walter Newman.

Prowashonupana Barley: A Review, Montana Agricultural Experiment Station, Montana State University, Bozeman, Montana, Authored By: C.W. Newman, Ph.D., Fasas and R.K. Newman, Ph.D., R.D., F.A.D.A.

*Primary Examiner*—Milton Cano
*Attorney, Agent, or Firm*—Lathrop & Gage, L.C.

[57] ABSTRACT

The present invention relates to a method for producing a barley fraction which has an increased amount of beta-glucan, at least 25% more than the barley flour used to form the barley fraction, an improved mouthfeel, and a viscosity higher than the barley flour used to form the barley fraction, and the barley fraction itself. The method includes the steps of cooking an amount of barley flour and separating the high beta-glucan barley fraction from the remainder of the cooked barley flour.

7 Claims, No Drawings

METHOD FOR OBTAINING A HIGH BETA-GLUCAN BARLEY FRACTION

FIELD OF INVENTION

The present invention relates to a method for separating a high beta-glucan barley fraction from the remainder of the barley grain, specifically the remainder of barley flour formed from barley grain. More specifically, the present invention relates to a method for treating barley flour so that the high beta-glucan barley fraction is produced, with the barley fraction having an increased beta-glucan content, a viscosity higher than the barley flour, and an improved mouthfeel.

BACKGROUND OF THE INVENTION

Beta-glucan, a cell wall polysaccharide, is present in grains, such as oats and barley, with the beta-glucan desired for human consumption because it has been found that beta-glucan can reduce serum cholesterol and lower the glycemic response in humans. The beta-glucan is found primarily in the endosperm cell wall portion of a barley grain. The beneficial effects of barley, and in particular beta-glucan, are discussed in articles by Macintosh et al. and Newman et al. (1,2). Because of the above discussed benefits it is desired to consume products containing an amount of beta-glucan, and more preferably an increased amount of beta-glucan.

It has further been found that barley often contains a relatively high amount of beta-glucan as compared to other grains so that barley is preferred for obtaining an adequate amount of beta-glucan. Generally, beta-glucan is found in barley in an amount ranging between about 5% and about 18% by weight of the barley. More typically, barley contains between about 5% and about 7% by weight beta-glucan, however, enhanced barley strains have been developed, Prowashonupana for example, which have between about 15% and about 18% by weight beta-glucan.

Even though certain strains of barley have comparatively high amounts of beta-glucan, it is desired to produce a barley flour or a barley fraction that has an even greater amount of beta-glucan than what is naturally found in barley flour derived from simply grinding barley grain. More specifically, regardless of the amount of beta-glucan found in barley, as it presently exists, it is desired to produce barley fractions or flours having enhanced amounts of beta-glucan. For example, if the barley grain starts with 18% by weight of beta-glucan, it is still desired to have a higher amount of beta-glucan in the barley flour or the barley fraction produced from such barley grain.

The barley grain can be ground into a flour or fraction for use in various food products, with it known that it is desired to have increased amounts of beta-glucan in the barley flour or fraction. In particular, the barley flour or barley fraction can be used to improve the functionality of beverages and the health benefits associated with the consumption of such beverages. Unfortunately, when barley flour is added to a beverage composition, the barley flour tends to impart a chalkiness or grittiness to the beverage. Chalkiness or grittiness is undesired because it is generally accepted that many consumers do not like beverages that leave a gritty feel in their mouth. For this reason, it is desired to have a barley product to add to beverages that does not result in a gritty chalky texture in the beverage. Thus, it is desired to have a barley product that, when used in beverages, has an enhanced amount of beta-glucan and that has an improved mouthfeel, so that a gritty or chalky texture is not imparted to the beverage containing the barley product. Consequently, it is desired to have methods which can be used to improve the mouthfeel of the barley flour and to enhance the amount of beta-glucan found in the barley flour.

It is believed one reason barley flour or barley products have a gritty chalky mouthfeel is because when they are mixed with liquid to form a beverage, the beverage has a relatively low viscosity and because the barley flour is uncooked. Further, it is known that increased viscosity often improves the mouthfeel of a beverage. Thus, it is desirable to have a barley flour or barley fraction that will potentially increase the viscosity of beverage which has the barley flour or fraction added thereto.

Many methods for forming barley flour or barley fractions have been developed which attempt to obtain comparatively high amounts of beta-glucan from barley. In particular, wet extraction methods have been used to successfully isolate high beta-glucan fractions from barley flour or grain allowing for the production of a barley flour or fraction having high levels of beta-glucan. Wet extractions are also desired because they produce a barley flour or fraction having a desirable mouthfeel and texture so that when beverages are made from the barley flour or fraction, the gritty chalky texture is not imparted to the beverage. Wet extraction processes, however, presently can be very expensive. For this reason, it is preferred to have a less expensive dry milling process for producing a barley flour or fraction.

Dry milling followed by sieving or air classification can be used to isolate or obtain high beta-glucan fractions from barley. It has been found, however, that dry milling produces a barley flour that has a low viscosity when added to liquid and that more importantly has an undesirable mouthfeel. In particular, the mouthfeel of the dry milled barley flour tends to be chalky and also tends to have a raw grain flavor. It has further been observed that the percentage of the high beta-glucan fraction recovered is typically low. For example, typically less than 50% of the original starting material is recovered as a high beta-glucan fraction. As such, it is desired to have a cost effective dry milling method for producing a barley flour or fraction that results in a barley flour or fraction having a high beta-glucan content, a high viscosity, a desirable mouthfeel, and a high beta-glucan fraction recovery.

A patent of particular interest that discloses a method for dry milling and preparing a high soluble fiber barley fraction is U.S. Pat. No. 5,063,078, issued to Foehse. Such patent discloses a method of pearling a barley flour followed by dry milling and then pin milling the barley flour such that from about 30% to about 80% of the particles are less than 50 microns. After pin milling the barley flour, the barley flour is classified to separate a coarse barley fraction from the remainder of the barley flour, with the coarse barley fraction containing a high amount of beta-glucan. As such, the Foehse patent discloses a method that results in a barley fraction having a high beta-glucan content, however, it is believed that the barley flour or fraction produced according to the Foehse patent is gritty, has a low viscosity, and contains a raw grain flavor. Thus, while the method of the Foehse patent results in a barley fraction having a sufficient amount of beta-glucan, the mouthfeel is believed to be undesired. It should further be pointed out that the Foehse patent does not teach cooking the barley flour.

Thus, it is greatly desired to be able to use a barley flour or barley fraction in beverages because the barley will contain beta-glucan, which is beneficial to human health. However, a number of problems associated with the use of barley flour or barley fractions containing beta-glucan must be overcome. First, it is desired to increase the percentage of beta-glucan found in the barley flour or fraction, as an increased amount of beta-glucan will provide increased benefits to consumers. Second, even if a barley flour or fraction having an increased amount of beta-glucan is produced, it is desired to have a fraction or flour that is more palatable, meaning it is desired to have a fraction or flour having improved mouthfeel and viscosity.

SUMMARY OF THE INVENTION

The present invention relates to a method for producing a barley fraction having an increased amount of beta-glucan, with the barley fraction also having an improved mouthfeel and a higher comparative viscosity than barley flour which is used to form the barley fraction. The barley fraction of the present invention is well suited for use in beverage compositions where it is desired to have a beverage that imparts fiber, especially beta-glucan, to a consumer, but which does not have a gritty or chalky mouthfeel. When the present barley fraction is added to the beverage composition, the beverage will have an amount of beta-glucan and a desirable mouthfeel. The method for forming the barley fraction includes cooking an amount of barley flour and separating the high beta-glucan fraction from the remainder of the barley flour, with separation occurring before or after the cooking step.

Barley flour, formed from ground barley grain, will typically have an average particle size ranging between about 5 and 50 microns and as much as 18% by weight beta-glucan. Also, when the barley flour is mixed with an amount of liquid to form a beverage, the beverage will generally be thin or not very viscous so that a drink made from the barley flour will have a less desirable mouthfeel. Comparatively, the barley fraction of the present invention will have at least 25% more beta-glucan than the barley flour, regardless of the amount of beta-glucan initially found in the barley flour used to form the barley fraction, and beverages formed from the barley fraction will have a higher viscosity than beverages formed from the barley flour. The present barley fraction has an improved mouthfeel and increased viscosity in liquids, with the increased viscosity also improving the mouthfeel. Thus, the resulting barley fraction is ideally suited for use in beverages because it has an increased amount of beta-glucan and an improved mouthfeel.

To produce the barley fraction it is necessary to cook an amount of barley flour and to then separate the high beta-glucan fraction from the remainder of the cooked barley flour. Cooking the barley flour is necessary to produce a barley fraction that has a higher viscosity when added to liquid and to ensure that the barley fraction has a better mouthfeel than the barley flour. Without the cooking step it is believed that the barley fraction would not have the improved mouthfeel and higher viscosity.

After cooking the barley flour it is necessary to separate the high beta-glucan portion from the remainder of the cooked barley flour. The separation will cause the formation of a barley fraction having an increased amount of beta-glucan. Any means can be used to separate the high beta-glucan fraction from the remainder of the cooked barley flour so long as the barley fraction has at least 25% more beta-glucan than the starting barley flour.

The preferred method for separating the high beta-glucan portion from the remainder of the cooked barley flour includes drying the cooked barley flour, milling the dried cooked barley flour, and then air classifying the milled dried cooked barley flour which will separate the high beta-glucan fraction from the barley flour. Other methods, however, can be used to separate out the high beta-glucan fraction. For example, the barley flour can be classified prior to cooking. It should be kept in mind that the endosperm cell wall portion of the barley grain contains the greatest amount of beta-glucan so that when the separation step is performed the maximum amount of endosperm cell wall material should be separated from the remainder of the barley flour.

The method of the present invention also allows for a high recovery. When the barley fraction is produced, at least 50% by weight of the starting barley flour is recovered as the high beta-glucan fraction of the present invention.

The present invention is advantageous for a number of reasons, the most important being the production of a barley fraction having an improved mouthfeel, a higher viscosity, and an increased amount of beta-glucan. Such barley fraction is ideally suited for use in beverage compositions because it provides beta-glucan to the consumer without a gritty chalky mouthfeel. The method is especially desired because it allows for the production of a barley fraction that has both a desired mouthfeel and an increased amount of beta-glucan.

DETAILED DESCRIPTION OF THE INVENTION

The present invention relates to a method for producing an improved barley fraction having an increased amount of beta-glucan and to the barley fraction itself. The barley fraction produced by the present method has at least 25% by weight more beta-glucan than the initial barley flour used to form the barley fraction. Additionally, the barley fraction has an increased viscosity when dissolved in solution, as compared to the barley flour used to form the barley fraction. The present barley fraction also has an improved mouthfeel, as compared to the barley flour, so that a barley fraction having an increased amount of beta-glucan, an increased viscosity, and an improved mouthfeel is produced. To produce the present barley fraction, the method includes cooking an amount of barley flour and separating the high beta-glucan portion from the remainder of the barley flour. Preferably, the separation occurs after cooking, but separation can also occur before cooking. The separation of the high beta-glucan portion from the remainder of the cooked barley flour preferably includes drying the cooked barley flour, then milling the barley flour, and finally air classifying the barley flour to produce the barley fraction.

The method is initiated by selecting an amount of barley flour that will be processed into the finished barley fraction. Any barley flour can be selected, with the barley flour typically having an amount of beta-glucan ranging between about 5% by weight and about 18% by weight of the barley flour. More preferably, a barley flour containing an amount of beta-glucan equal to from about 15% to about 18% by weight is selected. An example of a barley flour containing from about 15% to about 18% by weight beta-glucan is a barley flour derived from the Prowashonupana variety of barley. This is sold commercially under the name Sustagrain™, ConAgra™ Specially Grain Products Company, Omaha, Neb., and is a hulless waxy barley. In addition to having a particular amount of beta-glucan, it is desired for the barley flour to have a particle size ranging between about 5 microns and about 50 microns. More preferably, the barley flour will have a particle size of about 30 microns.

After selection of the barley flour, the barley flour is cooked to produce a cooked barley flour. The cooking step is necessary to produce a barley fraction that will have a higher viscosity than the barley flour and an improved mouthfeel. Any of a variety of methods and devices can be used to cook the barley flour. It is preferred, however, to extrusion cook the barley flour. It is most preferred to extrusion cook the barley flour in a twin-screw extruder, primarily because the twin-screw extruder allows for easier processing. It should be noted, however, that instead of using a twin-screw extruder, a single-screw extruder can be used. If the twin-screw extruder is used it is preferred for the screws to rotate at a speed ranging between about 350 revolutions per minute (rpm) and about 1000 rpm. More preferably, the screws will rotate at a speed equal to about 500 rpm. Also, steam should be added to the extruder to moisturize and cook the barley fraction, however, other means besides steam can be used. It is most important for the barley flour to be cooked and moisturized, with the moisture added to cause cooking and to prevent the barley flour from burning. The barley fraction should be cooked at a temperature equal to between about 80° C. and about 200° C., more preferably, the barley fraction should be cooked at a temperature ranging between about 100° C. and about 125° C. Typically, the barley flour will enter the cooking step having a moisture content equal to about 15% by weight of the barley flour. When the barley flour exits the cooking step it should have an average amount of moisture equal to between about 16% and about 30% by weight of the barley fraction. The amount of moisture, however, is not crucial so long as the barley flour is sufficiently cooked and is not burned.

After cooking, the high beta-glucan fraction needs to be separated from the remainder of the cooked barley flour. Beta-glucan is most often found in the endosperm cell wall portion of the barley grain so that the most beta-glucan can be recovered by separating the cell wall material from the remainder of the barley flour. As such, any separation step or steps can be used that ensure that the maximum amount of the cell wall portion, the high beta-glucan fraction, can be separated from the remainder of the barley flour. While any of a variety of methods can be used to separate the high beta-glucan fraction, the most preferred method includes drying the cooked barley flour, milling dried cooked barley flour, and air classifying the milled barley flour to separate the high beta-glucan portion from the remainder of the barley flour. The steps of the preferred separation method are discussed below.

In order to mill the cooked barley flour, it is preferred to dry the cooked barley flour so that it is ground or milled to a smaller size more easily. The cooked barley flour should be dried so that it has less than 13% by weight moisture, as this is considered a safe level for milling and storage. Any moisture level, however, can be used as long as the barley flour can be stored safely and easily milled. Any of a variety of devices can be used to dry the barley flour so long as the barley flour is sufficiently dried and is not damaged in the process.

The dried barley flour is then milled, more specifically dry milled, to reduce the particle size of the barley flour. Generally, the cooked barley flour is clumped together, so that it is necessary to break down the clumps so that the high beta-glucan portion can be separated from the remainder of the barley flour. As such, the milling step reduces the particle size of the barley flour so that the high beta-glucan fraction can be more easily separated. The milling step is performed to ensure that the barley flour will have an average particle size ranging between about 10 and about 40 microns. It should be noted that the milling step is not required if the cell wall portion of the barley flour has an average particle size ranging between about 10 microns and about 40 microns and can be separated from the remaining barley flour. If it is necessary to mill the barley flour, any of a variety of devices can be used so long as the desired particle size is achieved. It is most preferred to first mill the barley flour in a hammer mill and to then mill the barley flour in a pin mill. The pin mill will suitably reduce the size of the barley flour to allow for a high percentage of the high beta-glucan portion to be separated from the remainder of the barley flour. In order to maximize the amount of the high beta-glucan or cell wall portion recovered it is most preferred to pin mill the barley flour four (4) times.

Once dried and milled the barley flour must be processed to separate the endosperm cell wall or high beta-glucan portion from the remainder of the barley flour. This is preferably done in an air classifier, with it known that the air classifier must be operated in such a way so as to ensure that the maximum amount of high beta-glucan fraction is separated from remainder of the barley flour. To separate the high beta-glucan portion from the rest of the barley flour, the rotation speed, louvre angle, classifier blade disposition, classifier deck openings, and feed rate can all be adjusted on the air classifier. Regardless of how the classifier is operated it is desired to ensure that barley flour particles or the barley fraction, which contain most of the high beta-glucan particles, having a particle size ranging between 15 and 30 microns are separated from the remainder of the barley flour. The cell wall portion contains most of the beta-glucan and as such is the desired portion of the processed barley flour, with the cell wall portion generally forming the barley fraction. Also, while the air classifier is preferred, other separation means can be used such as passing the barley flour through a plurality of sieves.

The air classifier, as mentioned, will separate the high beta-glucan barley portion from the remainder of the barley flour and will result in the production of a barley fraction having at least 25% by weight more beta-glucan than the starting barley flour. Also, the process will result in a barley fraction yield equal to at least 50% by weight of the barley flour, in other words at least 50% of the barley flour is recovered as the barley fraction. It is also preferred if the barley fraction contains an amount of β-glucan equal to at least 20% by weight of the barley fraction; however, the final beta-glucan yield is dependent upon the amount of beta-glucan found in the barley flour. The barley fraction will also have a particle size equal to between about 15 microns and about 30 microns and will have a smooth non-gritty mouthfeel.

Once the barley fraction has been formed it can be mixed with an amount of a liquid to form a beverage composition. Additionally, other constituents can be added to the beverage composition such as flavors, vitamins, minerals, syrups, and any of a variety of other constituents which are used to form beverages and health drinks. The beverage formed from the barley fraction will have an increased amount of beta-glucan without a gritty mouthfeel resulting from the addition of the barley fraction.

An alternative embodiment of the present invention involves air classifying the barley flour first, then cooking the barley flour to produce the barley fraction. If this is done it is most preferred to then dry and grind the cooked barley flour as discussed above.

It should also be noted that all particle sizes mentioned in the specification were determined using a Fisher Sub-Sieve Particle Size Analyzer. This is important because not all devices give uniform results when determining particle size.

The following examples are for illustration purposes only and are not meant to limit the claims in any way.

EXAMPLES

Example 1

A barley fraction was formed by selecting an amount of a barley flour that was formed from a waxy hulless, whole grain barley having an amount of beta-glucan equal to between about 15% and about 18% by weight of the barley flour. The barley flour was sold under the name Sustagrain™, by ConAgra™ Specially Grain Products Company, Omaha, Neb. Also, the barley flour had an average particle size equal to about 32 microns, with the particle size for the barley flour and barley fraction determined using a Fisher Sub-Sieve Particle Size Analyzer, Model 95, manufactured by Fisher (Pittsburgh, Pa.).

After selecting the barley flour, 45 kilograms of the barley flour was extrusion cooked in a Wenger TX-57 twin-screw extruder sold by the Wenger Company, Sabetha, Kans., so that the barley flour was fed into the pre-conditioner portion of the extruder at a rate of 145 kg/hr. Water and steam were added to the barley flour in the pre-conditioner, with the pre-conditioner operating at a speed of 350 rpm. When the barley flour entered the extruder it had an amount of moisture equal to about 16.4% and had a temperature of about 90° C.

The extruder had a screw speed of 500 rpm and steam and water were added so that the temperature in the extruder was between about 100° C. and about 125° C. The moisture content in the extruder ranged between about 18% and about 22% by weight of the barley flour. The pressure developed in the extruder was about 2675 kPa. Additionally, the extruder had a 0.17 inch diameter die and a knife operating at 550 rpm. When the barley flour exited the extruder it had a moisture content equal to about 17.3% by weight.

The barley flour was then dried in a Wenger Series IV, model 4800 dryer, manufactured by Wenger of Sabetha, Kans. The barley flour was dried at a temperature ranging between 130° C. and 135° C. for 8.6 minutes, so that the barley flour had a moisture content equal to 2% by weight. The moisture content was determined by using the American Association of Cereal Chemists method 44-16.

Next the dried barley flour was ground to a finer particle size. About 12.1 Kg of the barley flour was first passed through a hammer mill, manufactured by Bliss of Ponca City, Okla., with the hammer operated at 3450 rpm. Further, the hammer mill was a 1.5 HP, 4 row, with 6 hammers, the hammer tips were 9 inches across. After passage through the hammer mill the barley flour had an average particle size equal to 36 microns.

The barley flour was then pin milled to achieve a finer particle size. An Alpine Pin Mill, model # 160Z, manufactured by Alpine (Augsburg, Germany) was used, with the Alpine Pin Mill turning at 3508 rpm. The pin mill had 4 rows of stationary pins equal to 196 pins and 4 rows of rotating pins equal to 204 pins. It should be pointed out that the barley fraction was passed through the pin mill step four (4) times. Once the barley flour had passed through the pin mill it had an average particle size of about 14 microns and approximately 12 kg of the barley flour remained. The following table shows the average particle size of the flour after each passage through the milling step, with the particle size determined using the Fisher Sub-Sieve Aanalyzer.

| Average Particle Size S.S.S. | |
|---|---|
| Hammer Mill | 36.00 microns |
| 1 pass (pin milling) P.M. | 20.00 microns |
| 2 pass P.M. | 16.00 microns |
| 3 pass P.M. | 15.00 microns |
| 4 pass P.M. | 14.20 microns |

After dry milling, the barley flour was divided into four (4) groups equal to 2.9 Kg. All four groups were air classified under different conditions, but in the same device. The air classifier was a Hurricane Turbo Separator, Type T 11, manufactured by the Pillsbury™ Co., Minneapolis, Minn. The following table lists the settings associated with each air classified step and the amount of coarse and fine that was separated. The coarse contained the endosperm cell wall portion and more specifically was the high beta-glucan fraction.

| 1 Setting Air Classification | | 2 Setting Air Classification | | 3 Setting Air Classification | | 4 Setting Air Classification | |
|---|---|---|---|---|---|---|---|
| 2890.0 g | | 2845.8 g | | 2903.4 g | | 2848.0 g | |
| C | F | C | F | C | F | C | F |
| 2801.5 g | 88.5 g | 2451.3 g | 394.5 g | 2135.2 g | 768.2 g | 1825.5 g | 1022.5 g |
| 97.0% | 3.0% | 86.1% | 13.9% | 73.5% | 26.5% | 64.1% | 35.9% |
| #1 Setting 5800 RPM 6 Deck Forward 10° Louvre Curtain | | #2 Setting 5800 RPM 6 Deck Backward 10° Louvre Curtain | | #3 Setting 3600 RPM 2 Deck Backward 10° Louvre Curtain | | #4 Setting 3600 RPM 2 Deck Backward 35° Louvre Curtain | |

"C" means coarse and "F" means fine, with the percentage and actual amount of each type of barley flour included. The setting describes how the classifier was set up. As the RPM goes up, the pulled-out percentage of fine appeared to go down. The smaller angle louvre curtains work best on the finer micron cuts. For coarser micron cuts, the 35° louver curtain works best. Forward curved blades generally give smaller pulled-out percentages than a corresponding setup using backward curved blades. As the number of classifier decks open is increased the pulled-out percentage goes down, with the pulled out percentage relating to the yield of fine.

Upon passage through the classifier, a barley fraction was formed. Each of the four barley fraction samples from the air classifier were examined to determine the percent fine and coarse (listed above). Also, four barley fraction samples, listed below, were analyzed to determine particle size of the fine and coarse, the percentage of beta-glucan present, and the percent moisture. The percent of beta-glucan present was determined according to the method published in the Journal of Institute of Brewing, Vol. 91, page 285 and Vol. 92, page 168. The sample numbers listed below were from the third and fourth settings above, with 59160 being the coarse fraction from setting three and 59162 relating to the coarse fraction from setting four. Samples 59161 and 59163 fine fractions from the third and fourth settings. The results were as follows:

| Sample number | | 59160 | 59161 | 59162 | 59163 |
|---|---|---|---|---|---|
| Moisture | | %3.3 | 4.1 | 3.5 | 4.03 |
| Beta Glucan | db | %21.86 | 9.9 | 22.69 | 11.88 |

Average particle size in microns ($\mu$) of the coarse and fine from the third and fourth settings:

| 59160 | Coarse (C) | 12.20 | u |
| | Fine (F) | 4.600 | u |
| 59161 | C | 17.00 | u |
| | F | 5.65 | u |
| 59162 | C | 20.00 | u |
| | F | 6.80 | u |
| 59163 | C | 22.0 | u |
| | F | 7.85 | u |

As can be seen, barley fractions having high percentages of beta-glucan can be obtained so that a barley flour having 18% beta-glucan can be processed into a barley fraction having a higher percentage of beta-glucan. It should be noted that the air classifier setting importantly determines percentage of beta-glucan found in the barley fraction.

Example 2

The mouthfeel of the barley fraction from Example 1, sample 59162, was compared to different barley flours, more specifically to a non-extruded high beta-glucan fraction, an ultrafine barley flour, and a cooked barley flour. The ultrafine barley flour had an average particle size equal to about 8 microns. To test the mouthfeel, the barley flours were blended with an amount of water so that the barley flour was added in an amount equal to 5% by weight of the water. More specifically, a 15 gram sample of each type of barley flour was blended in 250 ml of cold tap water and tasted immediately. The samples were coded as follows so that the tasters performed a blind taste test.

| Samples | Code |
|---|---|
| Cooked Sustagrain ™ Flour | 962 |
| Ultrafine Sustagrain ™ Flour | 458 |
| Non-extruded high beta-glucan (24%) Fraction | 621 |
| Extruded high beta-glucan (23%) Fraction | 784 |

Both the non-extruded and extruded fractions were obtained from Sustagrain™ Flour. The panel rated the samples as follows:

Sensory parameters:

Flavor bland (no flavor) 0 through 6 strong flavor
Mouthfeel smooth 0 through 6 gritty The following table discloses the results of the panel.

| | 962 | 458 | 621 | 784 |
|---|---|---|---|---|
| SENSORY RESULTS | | | | |
| Flavor | 1, 5, 3, 1, 1, 3, 0, 1 | 1, 4, 5, 5, 2, 2, 1 | 1, 5, 3, 4, 3, 1, 1 | 1, 3, 4, 6, 3, 2, 3 |
| Mouthfeel | 2, 5, 0, 1, 0, 3, 1, 0 | 2, 3, 2, 1, 3, 2, 2 | 3, 5, 3, 4, 2, 2, 2 | 1, 0, 4, 2, 3.5, 1, 0 |
| Rank | 4, 2, 4, 3, 4, 1 | 2, 3, 3, 2, 1, 1, 4 | 3, 4, 1, 1, 2, 3 | 1, 1, 2, 4, 3, 2 |
| AVERAGE OF SENSORY RESULTS | | | | |
| Flavor | 2.2 | 2.9 | 2.6 | 3.1 |
| Mouthfeel | 1 | 2.1 | 3 | 1.6 |
| Rank | 3 | 2.3 | 2.3 | 2.2 |

The panel tasting the barley flour water mixture consisted of eight (8) members and concluded that the non-extruded high beta-glucan barley fraction and the ultra-fine barley flour were less smooth as compared to the barley flour of sample 59162. Also, the non-extruded high beta-glucan barley fraction and the ultrafine barley flour were found to have a chalky or powdery mouthfeel, comparatively barley flour of sample 59162 was found to have a smooth non-chalky mouthfeel.

As expected, sample 962 had the smoothest mouthfeel because it was cooked. However, while sample 962 had a desirable mouthfeel it did not have an increased amount of beta-glucan, so that 962 is comparatively deficient in the amount of beta-glucan present. Importantly, the extruded barley high beta-glucan fraction formed according to the present process was smoother than the other two samples and had more beta-glucan than sample 962.

Example 3

The viscosity of the barley fraction from Example 1, sample 59162, was compared with Sustagrain™ Flour (the barley flour prior to processing with the present invention) and a non-extruded high beta-glucan Sustagrain™ fraction. Extrusion relates to whether the barley fraction or flour was cooked. The viscosity was measured in centipoise units (cp) by using a Brookfield Viscometer (Model DV-II, Brookfield Engineering Laboratories Inc., Stoughton, Mass.), equipped with a #4 spindle. The samples were prepared by dispersing either 5 grams or 10 grams of each type of barley flour in 200 ml of distilled water at 25° C. The results were as follows:

| Time   | rpm | Viscosity (cp) |
|--------|-----|----------------|
| Sustagrain ™ Flour 2.5% in Water (w/v) | | |
| 0      | 5   | 40    |
| 0      | 1.5 | 133.3 |
| 1/2 hr | 5   | 40    |
| 1/2 hr | 1.5 | 133.3 |
| 1 hr   | 5   | 40    |
| 1 hr   | 1.5 | 133.3 |
| Non-extruded Coarse Fraction 2.5% in water (w/v) | | |
| 0      | 5   | 40    |
| 0      | 1.5 | 133.3 |
| 1/2 hr | 5   | 80    |
| 1/2 hr | 1.5 | 133.3 |
| 1 hr   | 5   | 80    |
| 1 hr   | 1.5 | 133.3 |
| Non-extruded Coarse Fraction 5% in water (w/v) | | |
| 0      | 5   | 80    |
| 0      | 1.5 | 166.7 |
| 1/2 hr | 5   | 120   |
| 1/2 hr | 1.5 | 266.7 |
| 1 hr   | 5   | 120   |
| 1 hr   | 1.5 | 266.7 |
| Extruded Coarse Fraction 2.5% in water (w/v) | | |
| 0      | 5   | 40    |
| 0      | 1.5 | 133.3 |
| 1/2 hr | 5   | 240   |
| 1/2 hr | 1.5 | 266.9 |
| 1 hr   | 5   | 320   |
| 1 hr   | 1.5 | 533.3 |
| Extruded Coarse Fraction 5% in water (w/v) | | |
| 0      | 5   | 200   |
| 0      | 1.5 | 533.3 |
| 1/2 hr | 5   | 4320  |
| 1/2 hr | 1.5 | 7600  |
| 1 hr   | 5   | 9320  |
| 1 hr   | 1.5 | 16000 |

The following table summarizes the results for sample 59162 and the non-extruded coarse barley flour from above, when the viscometer was operated at 5 rpm with the #4 spindle.

|   | Viscosity (cp) at 2.5% concentration (w/v) | | Viscosity (cp) at 5% concentration (w/v) | |
|---|---|---|---|---|
|   | Zero Time | After 1 hour | Zero Time | After 1 hour |
| Non-Extruded High beta-Glucan Barley Fraction | 40 | 80 | 80 | 120 |
| Extruded High beta-Glucan Barley Fraction | 40 | 320 | 200 | 9320 |

As can be seen, the barley fraction of the present invention had a significantly higher viscosity than the non-extruded high beta-glucan barley fraction and the original Sustagrain™ barley flour. This is important because an increased viscosity means an improved mouthfeel.

The articles mentioned in the Background section are the following:

(1) Newman C. K. and Newman R. K. "Nutritional implications of beta-glucans in barley." Barley Genetics V. 1986, pp. 773–780.

(2) McIntosh, Newman, and Newman, "Barley Foods and Their Influence on Cholesterol Metabolism." World Rev. Nutr. Diet, Simopoulos, AP(ed), Basel, Karger 1995, vol. 77, pp. 89–108.

Thus, there has been shown and described a method for forming a barley fraction having an increased amount of beta-glucan and an improved mouthfeel and a barley fraction composition, which fulfill all of the objects and advantages sought therefor. It will be apparent to those skilled in the art, however, that many changes, variations, modifications, and other uses and applications for the subject method and compositions are possible, and also changes, variations, modifications, and other uses and applications which do not depart from the spirit and scope of the invention are deemed to be covered by the invention which is limited only by the claims which follow.

What is claimed is:

1. A method for producing a barley fraction having a high beta-glucan content, a high viscosity, and an improved mouthfeel, with said method increasing an amount of beta-glucan found in said barley fraction by 25% over a starting barley flour and increasing the viscosity over the starting barley flour, wherein said method comprises:

(a) selecting an amount of a barley flour having an average particle size ranging between about 5 microns and about 50 microns;

(b) cooking said barley flour to form an amount of a cooked barley flour;

(c) drying said cooked barley flour to produce a dried barley flour having an amount of moisture equal to less than 13% by weight of said barley flour;

(d) milling said dried barley flour so that said dried barley flour has an average particle size equal to between about 10 microns and about 40 microns; and, (e) air classifying said milled barley flour so as to separate said barley flour into coarse and fine fractions, with said coarse barley flour being selected for use as said barley fraction, so that said barley fraction has an average particle size equal to between about 15 microns and about 30 microns and 25% more beta-glucan than said barley flour.

2. The method of claim one wherein said barley flour has a beta-glucan content of greater than 15% by weight of said barley flour.

3. The method of claim I wherein said cooking step is an extrusion cooking step.

4. The method of claim 3 wherein said extrusion cooking step is conducted at a temperature ranging between about 100° C. and about 125° C., in a twin-screw extruder having a screw speed of about 500 rpm, with said cooked barley flour having a moisture content ranging between about 16% and about 30% by weight of said barley flour.

5. The method of claim 1 wherein said milling step includes pin milling said dried barley flour so that said barley flour has an average particle size ranging between about 10 and 40 microns.

6. The method of claim 1 wherein said milling step is conducted in a hammer mill so that a dried barley flour having an average particle size ranging between 30 and 40 microns is produced followed by pin milling said dried barley flour having an average particle size ranging between 30 and 40 microns to produce a barley flour having an average particle size of about 14 microns.

7. The method of claim 1 wherein said method results in at least 50% of said barley flour being recovered as said barley fraction.

* * * * *

UNITED STATES PATENT AND TRADEMARK OFFICE
CERTIFICATE OF CORRECTION

Patent Number: 6,083,547
Date of Patent: July 4, 2000
Inventor(s): Sarath K. Katta; Sambasiva R. Chigurupati; and Elizabeth A. Arndt It is certified that error appears in the above-identified patent and that said Letters Patent is hereby corrected as shown below:

In column 9, line 11, change

"59161 and 59163 fine fractions" to

"59161 and 59163 -- are the -- fine fractions"

Signed and Sealed this

Twenty-fourth Day of April, 2001

Attest:

NICHOLAS P. GODICI

Attesting Officer

Acting Director of the United States Patent and Trademark Office